US006783109B2

(12) United States Patent
Ogura et al.

(10) Patent No.: US 6,783,109 B2
(45) Date of Patent: Aug. 31, 2004

(54) ELECTROMAGNETIC FUEL INJECTION VALVE

(75) Inventors: Kiyotaka Ogura, Hitachinaka (JP); Atsushi Sekine, Mito (JP); Noriyuki Maekawa, Chiyoda-machi (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 100 days.

(21) Appl. No.: 10/274,379

(22) Filed: Oct. 21, 2002

(65) Prior Publication Data

US 2003/0151014 A1 Aug. 14, 2003

(30) Foreign Application Priority Data

Feb. 8, 2002 (JP) ...................................... 2002-031717

(51) Int. Cl.$^{7}$ ................................................ F16K 31/02
(52) U.S. Cl. .............................. 251/129.15; 251/129.15
(58) Field of Search ........................ 251/129.01–129.22

(56) References Cited

U.S. PATENT DOCUMENTS 4,403,741 A * 9/1983 Moriya et al. ........... 239/585.4
4,409,580 A * 10/1983 Ishigaki ...................... 335/243
5,791,630 A * 8/1998 Nakao et al. .......... 251/129.19
6,343,751 B1 * 2/2002 Ito et al. .................. 239/585.4
6,695,233 B2 * 2/2004 Sekine et al. ............ 239/585.1

FOREIGN PATENT DOCUMENTS

JP 10-339240 12/1998

* cited by examiner

*Primary Examiner*—Paul J. Hirsch
(74) *Attorney, Agent, or Firm*—Crowell & Moring LLP

(57) ABSTRACT

An electromagnetic fuel injection valve comprises a movable unit having a valve element, an electromagnetic coil, and a magnetic circuit for magnetically attracting the movable unit toward a valve opening side through energization of the electromagnetic coil. The magnetic circuit is composed of a hollow, cylindrical stationary core, which defines a fuel passage extending axially through an injection valve body, a hollow seal ring made of a nonmagnetic or a feeble magnetic material, a hollow nozzle housing, and a movable core constituting a part of the movable unit. The stationary core and the nozzle housing are joined together through the seal ring. This electromagnetic fuel injection valve has improved responsibility.

10 Claims, 11 Drawing Sheets

ELECTROMAGNETIC FUEL INJECTION VALVE

BACKGROUND OF THE INVENTION

The present invention relates to an electromagnetic fuel injection valve for internal combustion engines.

Hitherto, electromagnetic fuel injection valves driven by electric signals from an engine control unit have widely been used in internal combustion engines for motor vehicles. The conventional fuel injection valves have a construction in which an electromagnetic coil and a yoke accommodating the coil are arranged around a stationary core of a hollow cylindrical shape (center core) and a nozzle body is mounted to the lower portion of the yoke. The nozzle body has fitted therein a movable unit having a valve element. The movable unit is urged toward a valve seat by force of a return spring.

A conventional electromagnetic fuel injection valves, as described in, for instance, JP-A-10-339240 is known to have a construction in which a magnetic fuel connector section, a nonmagnetic intermediate pipe section and a nonmagnetic valve body section are formed in one united body by magnetizing a single pipe made from a composite magnetic material and demagnetizing only an intermediate portion of the pipe through induction heating or the like in order to reduce the number of parts and improve the assemblability. In this electromagnetic fuel injection valve, a cylindrical stationary iron core is press-fitted into the fuel connector section, and a movable core with a valve element is installed in the valve body section. Further, an electromagnetic coil is arranged around an intermediate outer circumferential portion of the pipe, with the yoke mounted on the outer side of the electromagnetic coil. When the electromagnetic coil is energized, a magnetic circuit is established through the yoke, fuel connector section, stationary core, movable core, valve body section and yoke to magnetically attract the movable core toward the stationary core. The nonmagnetic section is employed to prevent a possible short-circuit of magnetic flux between the fuel connector section and the valve body section.

In the construction as described in JP-A-10-339240 that has the nonmagnetic intermediate pipe portion at an intermediate part of the pipe, however, magnetic flux leakage cannot be prevented sufficiently, resulting in a reduced magnetic force for attracting the movable core and therefore deteriorated the responsiveness.

In recent years, also in gasoline engines, fuel injection valves that directly inject fuel into cylinders have been put into practical use. As the direct injection type fuel injection valve, a so-called long nozzle type injector has been proposed in which a nozzle body provided on a lower portion of a yoke is made slender and long. When the long nozzle injector is to be mounted on a cylinder head in which an intake valve, an intake manifold and other components are closely arranged near the injector, only the slender nozzle body that does not occupy a large space can be installed in the cylinder head, so that large-diameter body portions such as the yoke and a connector mold are disposed apart from other components and cylinder head to have no interference therewith. This injector thus has an advantage of high degree of freedom for installation. However, a nozzle driven by the movable core inherently becomes long due to the long length of the nozzle body, and the nozzle weight also increases, thereby posing a serious problem of a response delay due to a reduced magnetic force.

BRIEF SUMMARY OF THE INVENTION

An object of the present invention is to provide an electromagnetic fuel injection valve with improved responsiveness.

(1) To achieve the above objective, the invention provides an electromagnetic fuel injection valve which comprises a movable unit having a valve element, an electromagnetic coil, and a magnetic circuit for magnetically attracting the movable unit toward a valve opening side by energizing the electromagnetic coil. The magnetic circuit is composed of a hollow, cylindrical stationary core which defines a fuel passage extending axially through an injection valve body, a hollow seal ring made of a nonmagnetic or a feeble magnetic material, a hollow nozzle housing, and a movable core constituting a part of the movable unit, wherein the stationary core and the nozzle housing are coupled through the seal ring.

With this construction, it is possible to reduce flux leakage and improve a magnetic force and the responsiveness.

(2) In the above (1), preferably the seal ring has a flange at a lower portion thereof, a lower portion of the stationary core is press-fitted into an upper portion of the seal ring and welded thereto for sealing fuel, and the flange of the seal ring is press-fitted into a socket portion formed at an upper end of the nozzle housing and is welded thereto for sealing fuel.

(3) In the above (2), preferably, an outer circumference of a lower end of the stationary core is formed with a rounded or a tapered portion serving as a curved guide surface for press-fitting into the seal ring, and has a hard coating formed from a lower end face of the stationary core to the rounded portion or tapered portion.

(4) In the above (2), preferably, a contact surface between the movable unit and the stationary core is provided near an upper end of the flange of the seal ring.

(5) In the above (1), preferably the seal ring has a lower end portion formed to gently increase in inner diameter toward a lower end thereof, and an inner diameter of the lower end portion of the seal ring is larger than an inner diameter of the nozzle housing.

(6) In the above (1), the movable core preferably has a thin-walled portion at a lower portion thereof.

(7) In the above (1), the movable unit preferably comprises the movable core, the valve element and a joint for connecting the movable core and the valve element, and the joint comprises an upper cylinder portion, a lower cylinder portion smaller in diameter than the upper cylinder portion, and a tapered or spherical junction portion with a small fluid resistance for connecting the upper cylinder portion and the lower cylinder portion.

(8) In the above (7), the junction portion of the joint preferably has resiliency.

(9) In the above (8), a leaf spring is preferably provided between the movable core and the joint.

(10) In the above (7), preferably the junction portion of the joint has a hole for passage of fuel, and a total cross-sectional area of this hole is larger than a cross-sectional area of an axial fuel passage hole formed in the movable unit.

Other objects, features and advantages of the invention will become apparent from the following description of the embodiments of the invention taken in conjunction with the accompanying drawings.

DETAILED DESCRIPTION OF THE INVENTION

Referring to FIG. 1 through FIG. 12, an electromagnetic fuel injection valve according to an embodiment of the present invention will be now described.

Figure 1:
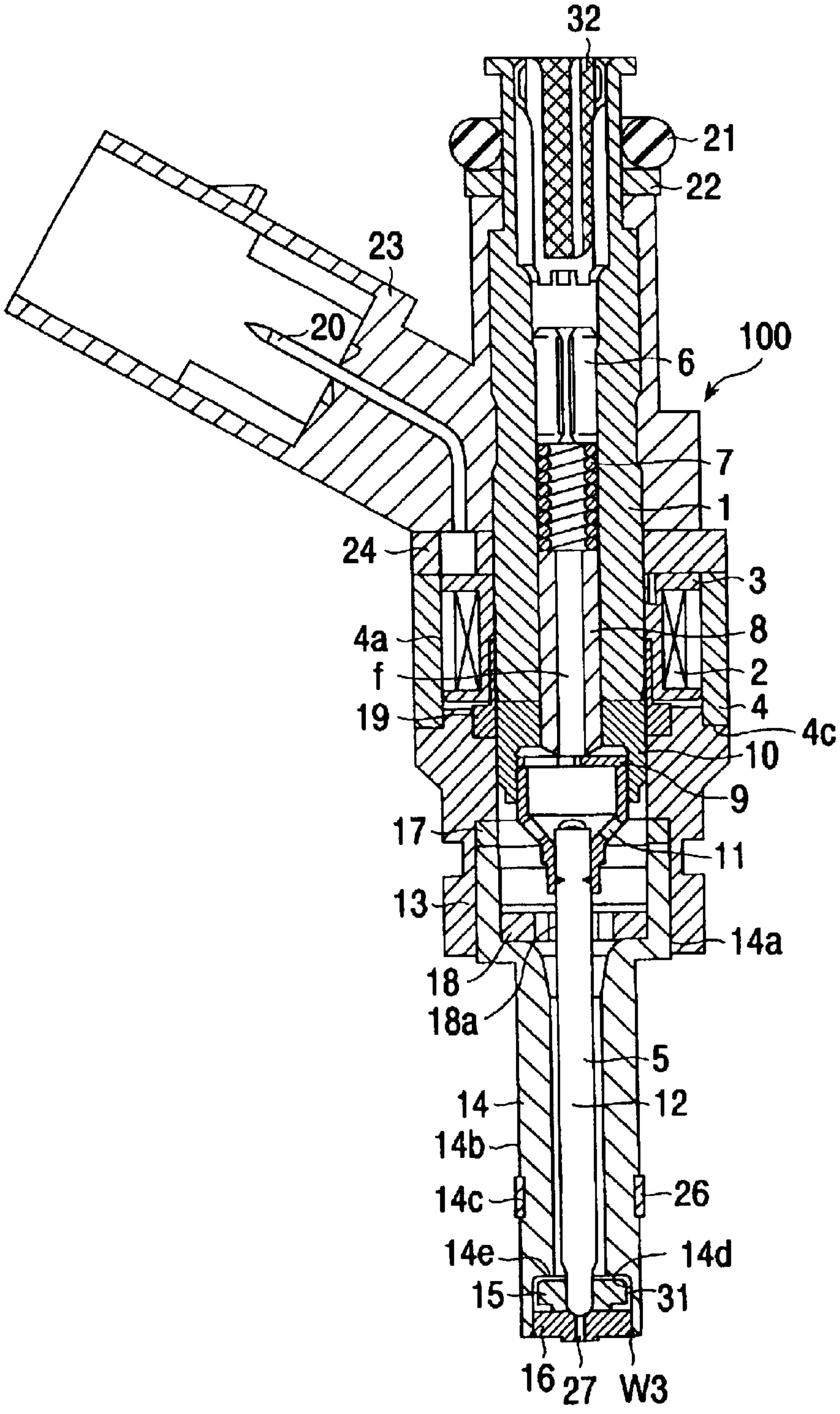
FIG. 1 is a longitudinal section view showing the overall construction of an electromagnetic fuel injection valve according to an embodiment of the present invention.

At the outset, the electromagnetic fuel injection valve according to the first embodiment will be explained with reference to FIG. 1. FIG. 1 is a longitudinal section view showing an overall construction of the electromagnetic fuel injection valve of this embodiment.

As shown in FIG. 1, a fuel injection valve 100 is of a so-called top-feed type which, when it is open, allows a fuel to flow in from a top of an injection valve body and flow down the valve in its axial direction and ejects the fuel out of an orifice provided at a lower end of the injection valve.

An axially extending fuel path in the fuel injection valve 100 is mainly composed of a hollow cylindrical stationary core 1 for introducing fuel, a hollow seal ring 19 having a flange at a lower portion thereof, a hollow nozzle housing 13 with its outer circumference tapered, a nozzle holder 14, and an orifice plate 16 with a valve seat.

Figure 2A:
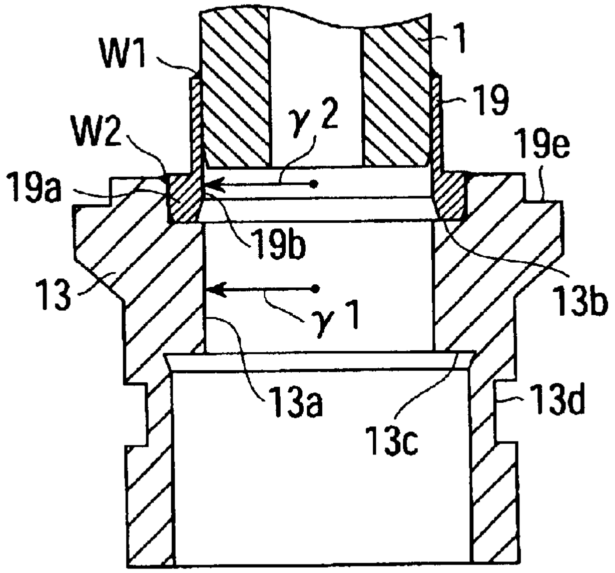
FIG. 2A is a section view showing a part of the fuel injection valve of FIG. 1.
Figure 2B:
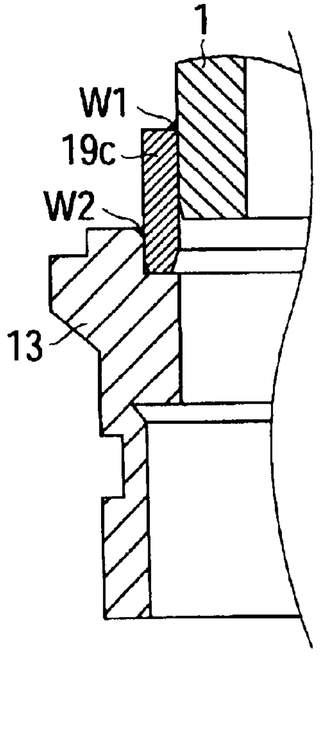
FIG. 2B is a section view showing a modification of the part shown in FIG. 1.

Now, referring to FIG. 2A, a construction of an essential part of the electromagnetic fuel injection valve of the embodiment will be described. FIG. 2A is a section view of the essential part. FIG. 2B is a section view of a modification of the essential part of FIG. 2A.

As seen in FIG. 2A, the seal ring 19 is press-fitted at its upper end portion over the stationary core 1 and welded thereto at a position indicated by reference sign W1. The seal ring 19 is formed with a flange 19*a* at its lower end, which is press-fitted into the nozzle housing 13 and welded thereto at a position indicated by reference sign W2. This welding is done in the circumferential direction before assembling of the injection valve. The press-fitting thus realizes secure fixing between the seal ring 19 and the stationary core 1 and between the flange 19*a* of the seal ring 19 and the nozzle housing 13. The reason for welding them together in the circumferential direction is to form a fuel path by the stationary core 1, the seal ring 19 and the nozzle housing 13 and to prevent the leakage of fuel from the fuel path formed. Compared with a case where the seal ring is fixed to the stationary core and the nozzle housing with the welding alone, welding them together after the press-fitting can reduce adverse effects of thermal distortion due to welding. Further, in this embodiment, an inner radius r2 of the seal ring 19 is set larger than an inner radius r1 of the nozzle housing 13 (r2>r1).

Next, as shown in FIG. 1, the nozzle holder 14 is received in a lower portion of the nozzle housing 13 through a stroke adjustment ring 17. A lower end of the nozzle housing 13 is secured to the nozzle holder 14 by a metal flow due to plastic flow joining. A plunger rod guide 18 is fixed in the nozzle holder 14 by press-fitting.

As described above, the stationary core 1, seal ring 19, nozzle housing 13, stroke adjustment ring 17 and nozzle holder 14 are securely coupled together to form a fuel passage assembly.

In the fuel passage assembly are incorporated a cylindrical movable core 10, a slender valve element 5, a joint pipe 11, a mass body 8, a return spring 7, a C-ring pipe 6 and others. The valve element 5 includes a valve rod. The movable core 10, the valve rod 5 and the joint pipe 11 are joined together to form the movable unit 12. The return spring 7 urges the movable unit 12 toward a valve seat 16*a*. The C-ring pipe 6 has a cross section in a letter C shape and serves as an element for adjusting a spring force of the return spring 7.

An electromagnetic coil 2 is arranged around an outer periphery of the stationary core 1 in an area where the seal ring 19 is press-fitted over the stationary core 1. A yoke 4 is arranged on the outside of the electromagnetic coil 2. A plate housing 24 is press-fitted over the stationary core 1 and welded to an upper end of the yoke 4 to form an assembly for accommodating the electromagnetic coil 2.

The fuel injection valve 100, when the electromagnetic coil 2 is energized, forms a magnetic circuit through the yoke 4, the stationary core 1, the movable core 10, the nozzle housing 13 and the plate housing 24. As a result, the movable unit 12 is attracted against the force of the return spring 7 to make a valve opening movement. When the electromagnetic coil 2 is deenergized, the force of the return spring 7 make the movable unit 12 engage the valve seat 16*a*, as shown in FIG. 1, closing the valve. In this example, a lower end face of the stationary core 1 serves as a stopper that receives the movable unit 12 when a valve opening movement.

Next, features of respective parts for use in the fuel injection valve 100 of this embodiment will be described.

The stationary core 1 is made from a stainless steel and formed into an elongate, hollow cylinder by press working and cutting. A hollow portion in the stationary core 1 provides a fuel passage, into an inner circumferential surface of which the C-ring pin 6 shaped like a letter C in cross section is press-fitted. Changing a depth by which the C-ring pin 6 is press-fitted may adjust a load of the return spring 7. A fuel filter 32 is installed above the C-ring pin 6.

The seal ring 19 is made of a nonmagnetic metal. Alternatively, a feeble magnetic metal may be used. The seal ring 19, as shown in FIG. 2A, has the flange 19*a* at its lower end and is thus shaped like a letter L in cross section on each side. The stationary core 1 and the nozzle housing 13 are joined through the seal ring 19. The lower end face of the stationary core 1 is roughly aligned in vertical position with the upper end face of the nozzle housing 13.

The flange 19*a* of the seal ring 19 is received in a counterbore 13*b* formed in the upper end of the nozzle housing 13. The height of the flange 19*a* and the depth of the counterbore 13*b* of the nozzle housing 13 are appropriately set at about 1–2 mm. The flange 19*a* of the seal ring 19 is so constructed as to shield a magnetic flux generated by the electromagnetic coil 2 and efficiently introduce it to the nozzle housing 13, the movable core 10 and the stationary core 1.

Conventionally employed is a construction in which the nozzle housing 13 and the seal ring 19 are formed in one united boy and a portion corresponding to the seal ring 19 is demagnetized. Hence, the shielding of magnetic flux is not sufficient, and resultant flux leakage reduces the magnetic force. The construction of the invention described above on the other hand can concentrate the magnetic flux in the nozzle housing 13, the movable core 10 and the stationary core 1 which together form the magnetic circuit, thus producing an enough magnetic force to attract the movable unit 12. This arrangement can improve the responsiveness when opening the valve.

It is also possible, as shown in FIG. 2B, to form a seal ring 19*c* into a hollow cylinder of a nonmagnetic or a feeble magnetic metal and to secure it to the nozzle housing 13 and the stationary core 1. Also in this case, the magnetic circuit for attracting the movable unit 12 can be prevented from developing magnetic flux leakage.

As shown in FIG. 2A, the nozzle housing 13 is made of a magnetic material and has a tapered portion on its outer circumference. Further, the nozzle housing 13 has counterbores 13*b*, 13*c*. The counterbore 13*b* is for receiving the seal ring 19 press-fitted therein. With the seal ring 19 press-fitted in the counterbored recess 13*b*, the upper end face of the flange 19*a* of the seal ring 19 slightly protrudes above the upper end face of the nozzle housing 13. This protrusion is for minimizing errors during welding.

After the seal ring 19 and the nozzle housing 13 are joined together, an inner circumference 19*b* of the seal ring is cut and ground for press-fitting over the stationary core 1. This machining sets the radius (r2) of the seal ring inner circumference 19*b* larger than the radius (r1) of a nozzle housing inner circumference 13*a*. This setting enables a high level of coaxialness between the seal ring inner circumference 19*b* and the nozzle housing 13. The assembly errors of the stationary core 1 can be reduced as less as possible, thereby making it possible to stabilize the operation of the fuel injection valve 100 and keep an O-ring 21 and a backup ring 22, both serving as fuel seals, in an appropriate range of condition during use.

The seal ring 19 is welded to the stationary core 1 and the nozzle housing 13 at locations indicated by the reference signs W1 and W2 to seal their inner circumferences and thereby prevent possible leakage of fuel flowing through the fuel injection valve 100

Since the welding location W1 is set at a thin-walled portion of the seal ring 19, the thermal energy required for the welding can be reduced, thereby preventing thermal deformations from occurring in parts of the fuel injection valve due to the welding heat.

The nozzle housing 13 has the counterbore 13*c* to receive the stroke adjustment ring 17 and a part of the nozzle holder 14. The housing also has an annular groove 13*d* necessary for joining with the nozzle holder 14.

The joining of the nozzle housing 13 and the nozzle holder 14 shown in FIG. 1 is done by pushing the end face of the nozzle housing 13 to cause plastic deformation thereof and its metal to flow into two grooves 14*a* formed in a maximum diameter portion of the nozzle holder 14. Thus, the nozzle holder 14 is securely fixed, and their inner circumferences are sealed to prevent leakage of fuel passing through the fuel injection valve 100.

As shown in FIG. 2A, the nozzle housing 13 has a stepped portion 13*e* on an outer circumference of an upper end thereof, which is adapted to receive the hollow, cylindrical yoke 4 of FIG. 1. With this fitting portion provided, it is possible to prevent positional deviations between the yoke 4 and the nozzle housing 13 when they are to be welded together after the electromagnetic coil 2 is accommodated.

Then, the plate housing 24 is axially pushed under pressure over the stationary core 1 until it contacts the upper end of the yoke 4. The contact surface between the upper end of the yoke 4 and the plate housing 24 is welded along the entire circumference.

Further, pin terminals 20 of the electromagnetic coil are bent and a resin molding 23 is formed to complete a yoke semi-assembly.

Figure 3:
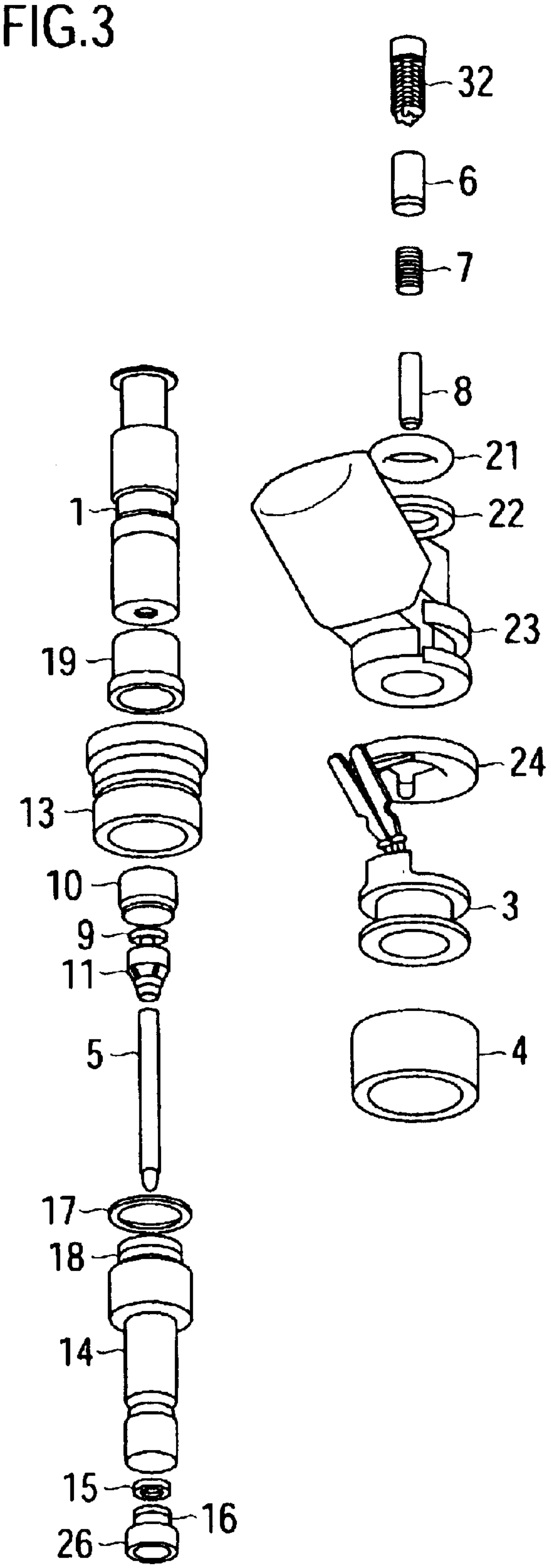
FIG. 3 is an exploded perspective view showing the overall construction of the fuel injection valve of FIG. 1.
Figure 4:
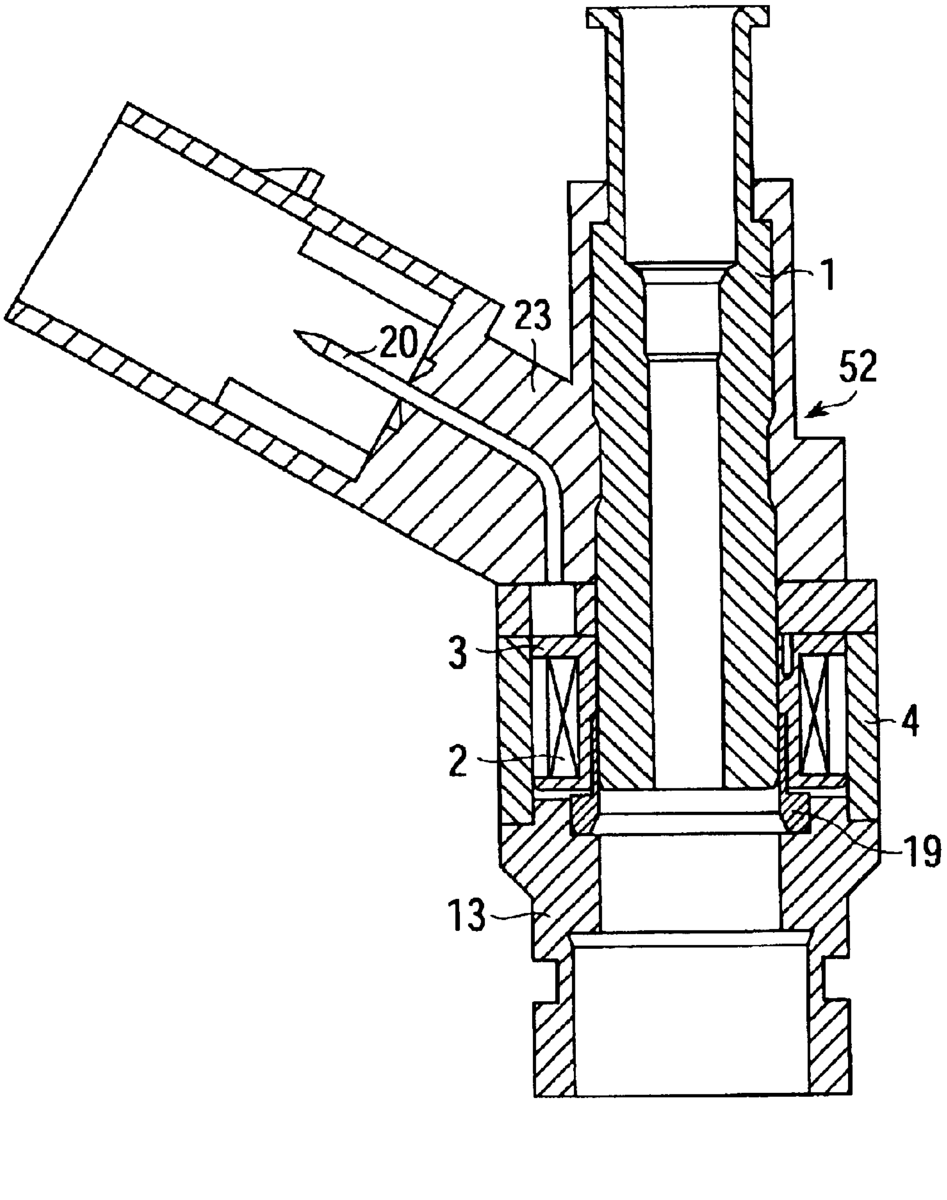
FIG. 4 is an enlarged view of a yoke assembly 52 for use in the fuel injection valve of FIG. 1.

Now, referring to FIGS. 3 and 4, a process of assembling the yoke semi-assembly 52 will be explained. FIG. 3 is an exploded perspective view showing the overall construction of the electromagnetic fuel injection valve of the embodiment. FIG. 4 is an enlarged view of the yoke semi-assembly 52 which constitutes a part of the electromagnetic fuel injection valve of the embodiment.

The process of manufacturing the yoke semi-assembly 52 of this embodiment has a feature that respective parts are stacked sequentially in one direction. More specifically, when manufacturing the yoke semi-assembly 52 shown in FIG. 4, first, the seal ring 19 is press-fitted into the nozzle housing 13 from above and welded thereto. Next, the stationary core 1 is press-fitted into the seal ring 19 from above and welded thereto. Then, the yoke 4 is fitted from above over the nozzle housing 13 and joined thereto by welding. Then, the electromagnetic coil 2 is installed from above on the inner circumferential side of the yoke 4. Further, the plate housing 24 is pushed under pressure axially from above of the yoke 4 over the stationary core 1 and joined by welding along its entire circumference. After that, the pin terminals 20 of the electromagnetic coil are bent and the resin molding 23 is formed. Thus, the yoke semi-assembly 52 as shown in FIG. 4 is formed.

Since the yoke semi-assembly 52 of the embodiment is manufactured by sequentially stacking the respective parts from one direction, as described above, the manufacturing of the yoke semi-assembly 52 can be easily automated.

Next, as shown in FIG. 1, a lower portion 14*b* of the nozzle holder is formed with a seal member mounting groove 14*c* in an outer circumference thereof, in which a seal member 26 such as a chip seal is installed. The nozzle holder lower portion 14*b* is longer than a conventional one and forms a so-called long nozzle portion.

Figure 5:
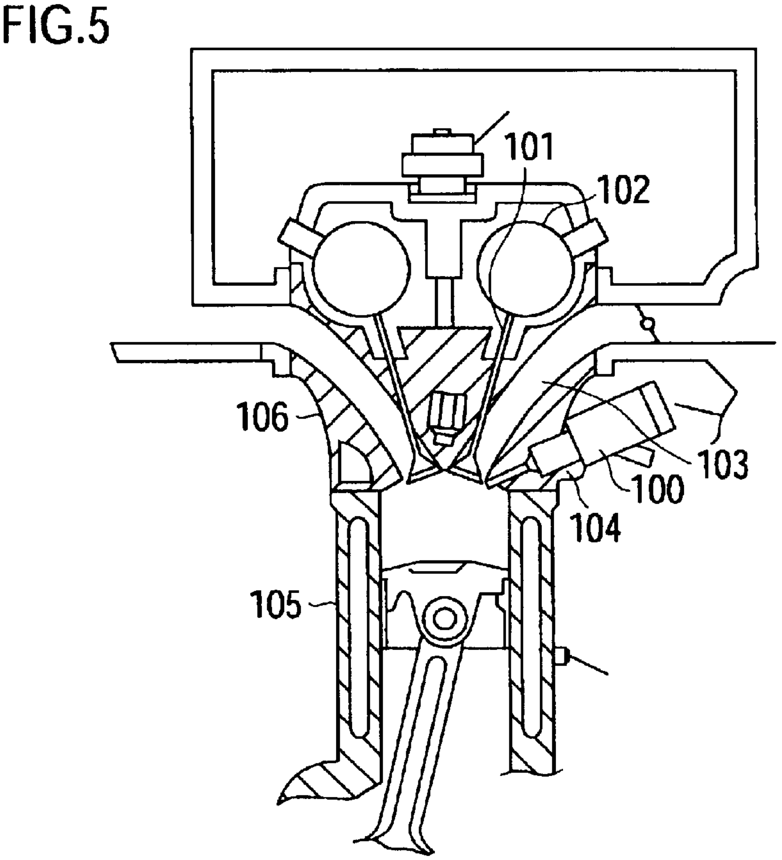
FIG. 5 is a section view of an internal combustion engine in which used is the electromagnetic fuel injection valve according to the embodiment of this invention.

Now, referring to FIG. 5, a configuration of an internal combustion engine using the fuel injection valve 100 will be described. FIG. 5 is a section view of the internal combustion engine in which the electromagnetic fuel injection valve of the embodiment is used.

In a fuel injection system in which a fuel injection valve is directly installed in a cylinder head 106 of an engine 105, when an intake valve 101, a drive mechanism 102 for the intake and exhaust valves, an intake manifold 103 and other parts are arranged close together, there are cases where a large-diameter injection valve body portion will interfere with these parts and the cylinder head 106. In that case, the long nozzle portion 14*b* of the fuel injection valve 100 shown in FIG. 1 allows the large-diameter injection valve body portion to be located remote from the engine parts and cylinder head 106 (i.e., at a position not interfered with), advantageously increasing the degree of freedom of installing the fuel injection valve.

When the fuel injection valve is mounted in the cylinder head, a conventional practice involves providing a gasket between the yoke bottom of a large-diameter and the cylinder head to prevent leakage of combustion gas from the engine. In the fuel injection valve 100 of the embodiment, the seal ring 26 installed on the outer circumference of the slender long nozzle portion 14*b* seals between the outer circumference of the long nozzle portion 14*b* and an inner circumference of an insertion hole for this nozzle portion (in the cylinder head 106) to prevent a combustion gas leakage from the engine. Thus, a combustion pressure receiving area at the sealing position can be reduced, which in turn contributes to a size reduction, a simplified structure and a reduced cost of the seal member.

As shown in FIG. 1, at the lower end (front tip) of the nozzle holder 14 are provided an orifice plate 16 and a fuel swirler (hereinafter referred to as a swirler) 15. These parts 14, 15 and 16 are formed as separate members.

Figure 6:
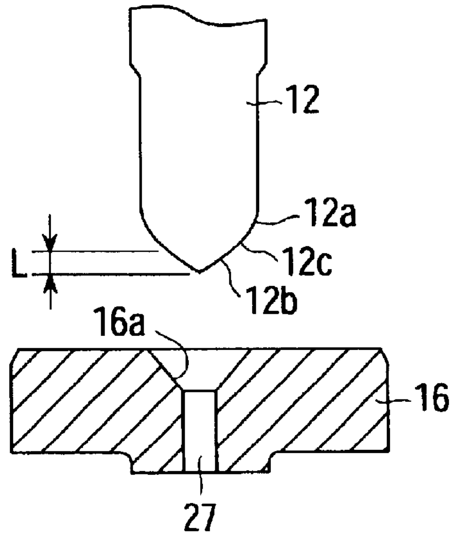
FIG. 6 is an enlarged view showing a construction of an orifice plate 16 and a front end portion of a movable unit 12 for use in the fuel injection valve of FIG. 1.

Now, referring to FIG. 6, description will be made on the orifice plate 16. FIG. 6 is an enlarged view showing the orifice plate 16 and the front end portion of the movable unit 12, both for use in the electromagnetic fuel injection valve of the embodiment.

As shown in FIG. 6, the orifice plate 16 is formed of a disc-shaped chip of, for example, stainless steel with an injection hole or orifice 27 formed at the center thereof. The orifice 27 is connected with a valve seat 16*a* formed upstream thereof in the orifice plate 16.

As shown in FIG. 1, the orifice plate 16 is installed by press-fitting into a recess 14*d* of a lower end of the nozzle holder 14. The swirler 15 is formed from a sintered alloy and press-fitted in the recess of the lower end of the nozzle holder 14.

Figure 7A:
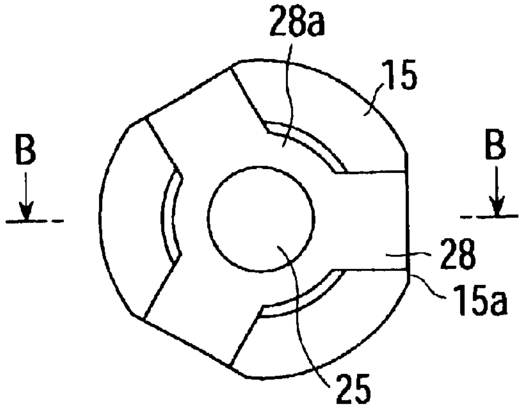
FIGS. 7A to 7C are top, section and bottom views showing in an enlarged scale a swirler 15 for use in the fuel injection valve of FIG. 1.
Figure 7B:
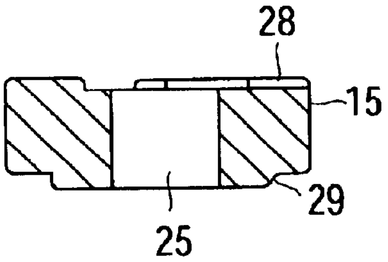
Figure 7C:
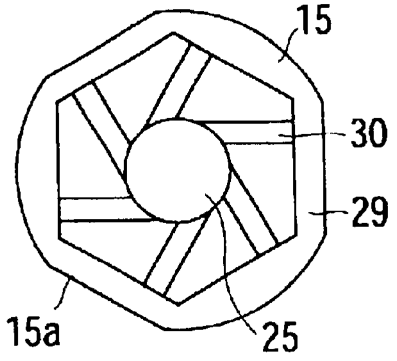

Here, referring to FIGS. 7A–7C, the swirler 15 will be explained. FIGS. 7A–7C are enlarged views showing the construction of the swirler 15 for use in the electromagnetic fuel injection valve of the embodiment. FIG. 7A is a top view, FIG. 7B a section view taken along the line B—B of FIG. 7A, and FIG. 7C a bottom view.

As shown in FIG. 7A, the swirler 15 is of a chip which is in the shape close to a regular triangle with its vertices rounded. At the center the swirler 15 has a center hole (guide) 25 for slidably guiding the front end (valve element) of the movable unit 12. On the upper surface of the swirler 15 is formed an annular groove 28*a* around the center hole 25. Guide grooves 28 are formed to radially extend outwardly from the annular groove 28*a* to introduce fuel to chamfers 15*a* at outer three sides of the swirler.

As shown in FIG. 7C, on the bottom surface of the swirler 15 is formed an annular step (flow path) 29 along its outer periphery. A plurality of passage grooves 30 (six in this embodiment) for swirling fuel are formed between the annular flow path 29 and the center hole 25. These passage grooves 30 extend from the outer circumference of the swirler 15 toward the inner circumference almost tangentially thereto so that the fuel injected from the passage grooves 30 to the lower end of the center hole 25 has a swirling force. The annular step 29 is provided to serve as a fuel reservoir.

Further, as shown in FIG. 7A, there are three chamfers 15*a* formed on the outer periphery of the swirler 15. The chamfers 15*a* provide fuel passages between them and the inner circumference of the nozzle holder 14 when the swirler 15 is fitted in the front end of the nozzle holder 14, and also serve as a reference when machining the grooves 28, 30. The rounded surfaces provided at the outer periphery of the swirler 15 engage the inner circumference of the front end of the nozzle holder 14. When the swirler 15 is shaped like an almost regular triangle with its vertices rounded as described above, it has an advantage of being able to secure a greater fuel flow than that provided by a polygon chip with four or more angles.

As shown in FIG. 1, the front end of the nozzle holder 14 (the end on the fuel injection side) is formed with the recess having a receiving surface 14*e* (stepped recess), 14*d*, for mounting of the swirler 15 and the orifice plate 16. The swirler 15 is fitted into the recess of the nozzle holder so as to rest on the receiving surface 14*e* of the nozzle holder 14. Further, the orifice plate 16 is press-fitted into the recess 14*d* and welded thereto, so that it bears on the swirler 15. Reference sign W3 indicates a location where the orifice plate 16 is welded along its entire circumference.

With the swirler 15 and the orifice plate 16 mounted as described above, the swirler 15 is held between the receiving surface 14*e* and the orifice plate 16. Although the upper surface of the swirler 15 is in press-contact with the receiving surface 14*e* of the nozzle holder 14, the provision of the fuel guide grooves 28, as shown in FIG. 7A, allows the fuel upstream of the swirler to flow through these grooves 28 to fuel flow paths 31 on the outer circumference of the swirler 15.

Figure 8:
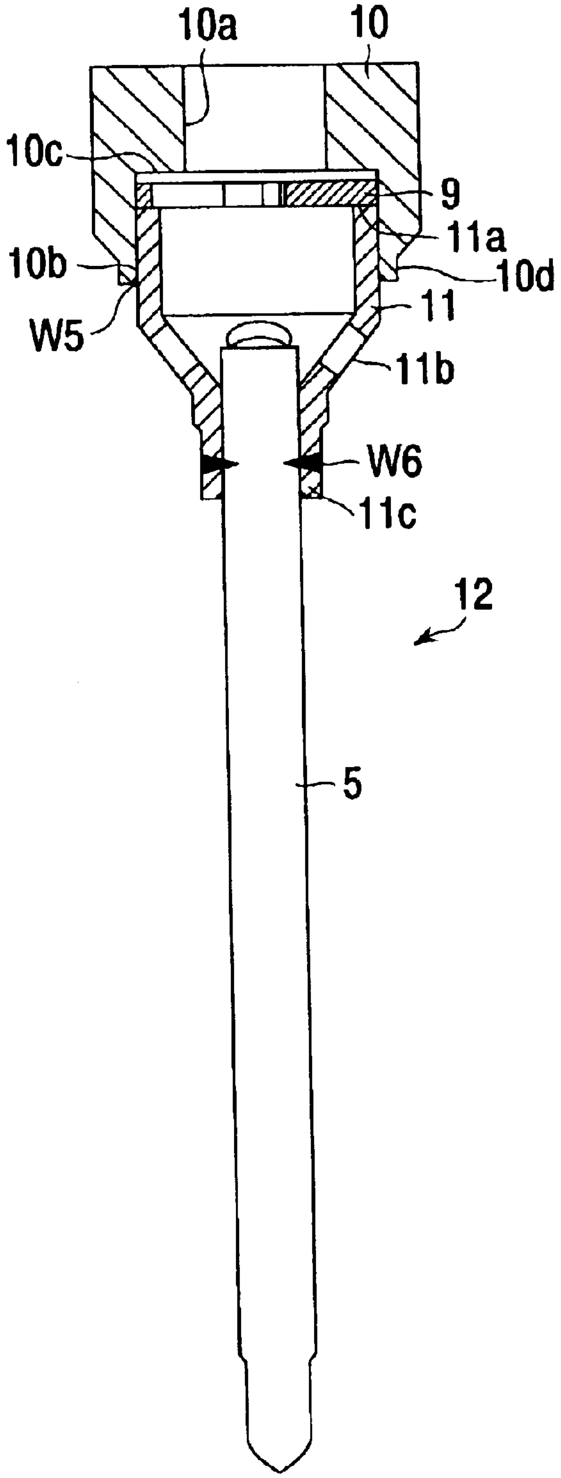
FIG. 8 is a side view of the movable unit 12 for use in the fuel injection valve of FIG. 1.

Now, referring to FIG. 8, the movable unit 12 will be explained. FIG. 8 shows a side view of the movable unit 12 used in the electromagnetic fuel injection valve of the embodiment.

In the movable unit 12, as shown in FIG. 8, the movable core 10 and the valve element 5 are connected together through the joint 11 having a spring function. Further, a leaf spring (damper plate) 9 is interposed between the movable core 10 and the joint 11.

Further, as shown in FIG. 1, a mass body 8 (also referred to as a weight or movable mass) is arranged to extend from an axial hole f constituting a fuel passage in the stationary core 1 to an axial hole in the movable core 10. This mass body 8 is axially movable independent of the movable unit 12. The mass body 8 is situated between the return spring 7 and the leaf spring 9. Thus, a spring load of the return spring 7 is applied to the movable unit 12 through the mass body 8 and the leaf spring 9.

As shown in FIG. 8, the movable core 10 has an upper axial hole 10*a* for accepting a part of the mass body 8, and a lower axial hole 10*b* of a larger diameter than that of the upper axial hole 10*a*.

Figure 9A:
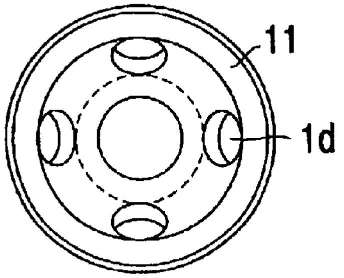
FIGS. 9A and 9B are top and section views showing in an enlarged scale a joint 11 for use in the fuel injection valve of FIG. 1.
Figure 9B:
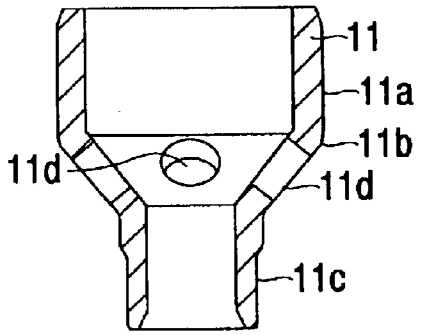

Here, referring to FIGS. 9A and 9B, the joint 11 will be explained. FIGS. 9A and 9B are enlarged views showing a construction of the joint 11 used in the electromagnetic fuel injection valve of the embodiment. FIG. 9A is a plan view and FIG. 9B a longitudinal section view.

As shown in FIGS. 9A and 9B, the joint 11 is of a cup-shaped pipe which has an upper cylinder portion 11*a*, a lower cylinder portion 11*c* with a smaller diameter than that of the upper cylinder portion 11*a*, and a tapered portion 11*b* between the upper cylinder portion 11*a* and the lower cylinder portion 11*c*, all these portions formed in one united body. The tapered portion 11*b* has a function of a leaf spring.

Further, as shown in FIG. 8, the upper cylinder portion 11*a* is fitted into a lower axial hole 10*b* of the movable core 10 and welded thereto at a position W5 along its entire circumference, thus securing the joint 11 to the movable core 10.

There is an inner stepped surface 10*c* between the upper axial hole 10*a* and the lower axial hole 10*b* of the movable core 10. The leaf spring 9 is interposed between the inner stepped surface 10*c* and the upper end face of the upper cylinder portion 11*a* of the joint 11. An upper part of the valve element (valve rod) 5 of the movable unit 12 is welded to the lower cylinder portion 11*c* of the joint 11 at a position W6 along its entire circumference.

Figure 10A:
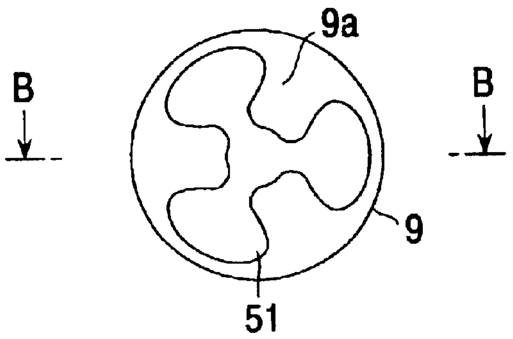
FIGS. 10A and 10B are top and section views showing in an enlarged scale a leaf spring 9 for use in the fuel injection valve of FIG. 1.
Figure 10B:
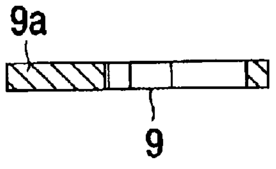

Now, referring to FIGS. 10A and 10B, the leaf spring 9 will be explained. FIGS. 10A and 10B are enlarged views showing a construction of the leaf spring 9 used in the electromagnetic fuel injection valve of the embodiment. FIG. 10A is a plan view, and FIG. 10 a longitudinal section view.

As seen in FIG. 10A, the leaf spring 9 is in a ring shape with its inner portions punched out as indicated by 51. The punching forms a plurality of elastic pieces 9*a* protruding inwardly that are arranged at equal distances along the circumference. The lower end of the cylindrical, movable mass body 8 is received and supported by these elastic pieces 9*a* of the leaf spring 9.

Further, as shown in FIG. 8, a thin-walled portion 10*d* is formed at the lower end portion of the movable core 10 along its entire outer circumference. The seal ring 19 shown in FIG. 1 is formed of nonmagnetic material and thus does not constitute the magnetic circuit. But those parts of the nozzle housing 13 and the movable core 10 that are situated immediately below the seal ring 19 form the magnetic circuit. However, the lower end portion of the movable core 10 has a reduced flux density and thus does not function as a magnetic circuit. At this lower end portion of the movable core 10 that does not function as the magnetic circuit the thin-walled portion 10*d* is provided. Since the lower end portion does not function as the magnetic circuit, forming it into the small-thickness portion does not adversely affect the characteristic of the magnetic circuit. On the other hand, the reduction of the thickness can reduce the weight of the movable core 10, which in turn leads to a reduction in the weight of the movable unit 12 and an improvement of responsiveness in opening the valve.

As described above, since in this embodiment the leaf spring 9 supports the mass body (first mass body) 8 and the leaf spring portion (tapered portion) 11*b* of the joint 11 supports the movable core (second mass body) 10, the mass body and the leaf spring function for supporting it (damper function) are duplicated.

When during a closing operation of the fuel injection valve the movable unit 12 strikes against the valve seat 16*a* due to the spring force of the return spring 7, the impact is absorbed by the tapered portion 11*b* of the joint 11. Further, a kinetic energy of rebounding of the movable unit 12 is absorbed by an inertia of the movable mass body 8 and an elastic deformation of the leaf spring 9 to prevent a rebound. With this provision of the double damper structure as described above, even in the fuel injection valve of an in-cylinder injection type with a large spring load of the return spring 7, the impact energy of the valve element during the valve closing operation can be sufficiently attenuated to effectively prevent a secondary injection due to the rebound of the valve element.

As shown in FIG. 1, the interior of the joint 11 as well as that of the mass body 8 constitutes a fuel passage f. The tapered portion 11*b* of the joint 11 has a plurality of holes lid formed for passage of fuel to the nozzle holder 14, as shown in FIG. 9B.

In this embodiment, a total sectional area of the fuel passage holes 11*d* is set larger than a sectional area of the fuel passage f defined inside the stationary core 1 and the mass body 8. When the inner diameter of the fuel passage f is taken to be 2ϕ, setting the inner diameter of the fuel passage holes 11*d* to 1.5ϕ results in the total sectional area of the four fuel passage holes 11*d* being 7.1 $mm^2$ while the fuel passage f has a sectional area of 3.1 $mm^2$. It is therefore possible to reduce a pressure loss at the joint in the fuel passage and to avoid excessive throttling of fuel flow. As a result, the movable unit 12 can be operated in a stable manner, and further the fuel pressure at which to operate the fuel injection valve can be increased.

Since the joint 11 is formed as a cup-shaped pipe having the upper cylinder portion 11*a*, the lower cylinder portion 11*c* and the tapered portion 11*b* between them formed integral as one piece, it has the shape which is small in stream friction. Hence, a fluid resistance of the movable unit 12 including the joint 11 caused as it is moved can be reduced, thereby improving the responsiveness of the valve during its closing operation. The shape of the tapered portion 11*b* is not limited to a taper and it may be semispherical.

As shown in FIG. 1, a part of the valve element 5 serves as a guide surface on the movable unit side. An inner circumference 18*a* of the plunger rod guide 18 and an inner circumference of the center hole 25 of the swirler 15 form a guide surface, which constitutes a so-called 2-point support guide system, for slide-guiding the valve rod 5.

The yoke 4 shown in FIG. 1 is made of a magnetic stainless steel by press working or cutting and in a cylindrical shape for accommodating the electromagnetic coil 2. The electromagnetic coil 2 is installed through the upper end of the yoke 4. A yoke lower portion 4*c* is fitted over a part of the outer circumference of the nozzle housing 13, and the position of the electromagnetic coil 2 is determined by an upper end face or flange 19*a* of the seal ring.

Figure 11:
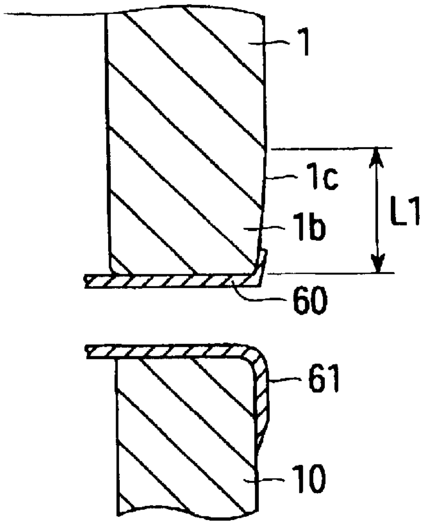
FIG. 11 is an enlarged view of an essential part of a stationary core 1 and a movable core 10 for use in the fuel injection valve of FIG. 1.

In this embodiment, a stroke of the movable unit 12 is defined by the valve seat 16*a* and the lower end of the stationary core 1. Since the lower end face of the stationary core 1 therefore abuts against the upper surface of the movable core 10 when the valve is closed, the lower end face of the stationary core 1 and the upper surface of the movable core 10 are subject to a hard coating treatment, such as chrome plated films 60, 61. FIG. 11 is an enlarged view showing essential parts of the stationary core 1 and the movable core 10 used in the electromagnetic fuel injection valve of the embodiment.

As shown in FIG. 11, a lower end 1*b* of the stationary core 1 is formed with a rounded portion 1*c* that serves as a curved guide surface for press-fitting into the seal ring 19. The rounded portion 1*c* extends in a range indicated by L1 in FIG. 11 and, in this example, has a curvature of about R=2.5 mm. With the lower end 1*b* of the stationary core 1 thus narrowed by the rounded portion 1*c*, a smoother press-fitting can be assured than when the lower end of the stationary core 1 is tapered. That is, in the case of the tapered lower end, an intersecting point between a taper line and a straight line has a wide angle edge, so that there is a fear that a galling will occur in the press-fitted portion of the seal ring at the wide angle edge position during the press fitting. This example does not cause such a problem.

The hard coating treatment such as chrome plated film 60 made on the lower end face of the stationary core 1 extends to a lower end side surface of the stationary core 1. More specifically, the hard coating is formed from the lower end face of the stationary core 1 to the rounded portion (curved guide surface) 1*c* (not exceeding the range indicated by reference sign L1) in such a manner that no difficulty is in the press-fitting, that is, an outer diameter of the lower end portion of the core plus a thickness of the hard coating is smaller than an outer diameter of the straight portion of the stationary core 1. This provides wear resistance and impact resistance.

As shown in FIG. 6, the valve element 5 of the movable unit 12 has its front end in the configuration of combining a spherical surface 12*a* and a conical projection 12*b*. The spherical surface 12*a* and the conical projection 12*b* have a discontinuous portion at a position indicated by reference numeral 12*c*. The spherical surface 12*a* rests on the valve seat 16*a* when the valve is closed. Forming the surface that contacts the valve seat 16*a* into the spherical surface 12*a* prevents a gap from being formed between the valve seat and the valve element even when the valve element tilts. The conical projection 12*b* has a function of minimizing a dead volume of the orifice 27 and regulating the fuel flow. The provision of the discontinuous portion 12*c* has an advantage of facilitating, and increasing the precision of, a polishing finish when compared with a case where the conical portion and the spherical surface portion are formed continuous.

Next, referring to FIG. 3, a process of assembling the nozzle will be explained. First, the swirler 15 is placed in the front end of the nozzle holder 14, and the orifice plate 16 is press-fitted into the front end and welded thereto. The movable unit 12, which is already assembled as shown in FIG. 8, is inserted into the nozzle holder. The movable unit 12, after being assembled, is formed with the chrome plated film 61, as shown in FIG. 11. When assembling the nozzle holder 14 into the yoke semi-assembly 52 which is already assembled as shown in FIG. 4, the stroke adjustment ring 17 is set to a desired dimension to easily determine the stroke of the movable unit 12. Then, the nozzle housing 13 and the nozzle holder 14 are joined together by metal flow. In the last step, the mass body 8, return spring 7, spring adjustment member 6, fuel filter 32, O-ring 21 and backup ring 22 are assembled.

Figure 12:
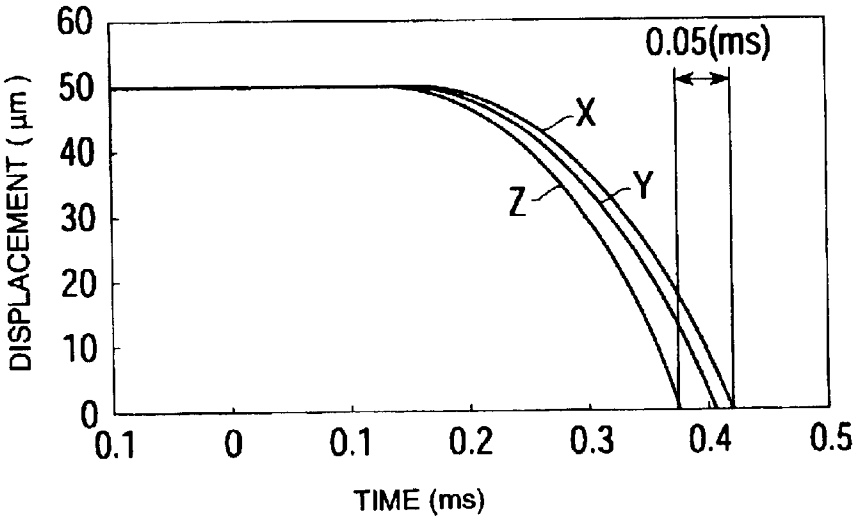
FIG. 12 is a response characteristic diagram of the electromagnetic fuel injection valve according to the embodiment of the invention.

Then, referring to FIG. 12, a response characteristic of the fuel injection valve according to the embodiment will be described. FIG. 12 is a response characteristic diagram of the fuel injection valve of this embodiment. An abscissa in the diagram represents time (ms) and an ordinate represents a displacement ($\mu$m) of the movable unit.

FIG. 12 shows a displacement of the movable unit when a close signal is given to the fuel injection valve 100 at time 0 ms. In the diagram, reference sign X represents a response characteristic of a conventional fuel injection valve when closing the valve, which took about 0.42 ms until it closes. This conventional fuel injection valve is of the type having a part of the nozzle holder demagnetized. Reference signs Y and Z represent response characteristics of the fuel injection valves according to the embodiment during the valve closing. The fuel injection valve indicated by reference sign Y is of the example having the thin-walled portion 10*d* formed at the lower end of the movable core 10, as shown in FIG. 3, to reduce the weight of the movable unit. The response time of this valve is 0.405 ms, which is shorter than that of the conventional valve indicated by reference sign X. The fuel injection valve indicated by reference sign Z is of the example realizing a weight reduction of the movable unit by the thin-walled portion 10*d* shown in FIG. 3 and also a reduction in magnetic flux leakage by using the independent, nonmagnetic seal ring 19 shown in FIG. 1. The response time of this valve is 0.37 ms, which is shorter than that of the conventional valve indicated by the reference sign X.

As described above, in this embodiment the fuel passage assembly is formed by welding the nozzle housing 13 and the seal ring 19 together as shown in FIG. 4. Further, this assembly and the stationary core 1 are joined by welding. This arrangement enables the manufacture of the fuel injection valve without deteriorating the accuracy of assembling the nozzle housing 13 and the stationary core 1. In addition, although the seal ring 19 has the flange 19*a* and is thus shaped like a letter L in cross section on each side, magnetic flux leakage from the magnetic circuit is minimized by adopting a nonmagnetic or a feeble magnetic material. The magnetic flux flows concentratedly between the lower end of the stationary core 1 and the movable core 10, thus improving a magnetic attraction characteristic of the solenoid valve. This in turn improves the responsiveness during the valve closing operation.

Further, when a part of the nozzle holder 14 is received in and joined to the nozzle housing 13, the stroke adjustment ring 17 is interposed between them. This arrangement can set the stroke of the movable unit 12 to a specified value, thus enabling the delivery of a volume of fuel required of the fuel injection valve.

Moreover, since the impact and rebound of the valve element at time of closing the fuel injection valve are effectively prevented by the double damper structure, the secondary injection can be prevented more effectively than ever. The yoke semi-assembly is of the construction in which its components are successively stacked in one and the same direction, the assembling procedure is simple and can be automated easily.

While the above description has been made on the fuel injection valve of in-cylinder injection type, the present invention can also be applied to a fuel injection valve arranged in an intake manifold.

Figure 13:
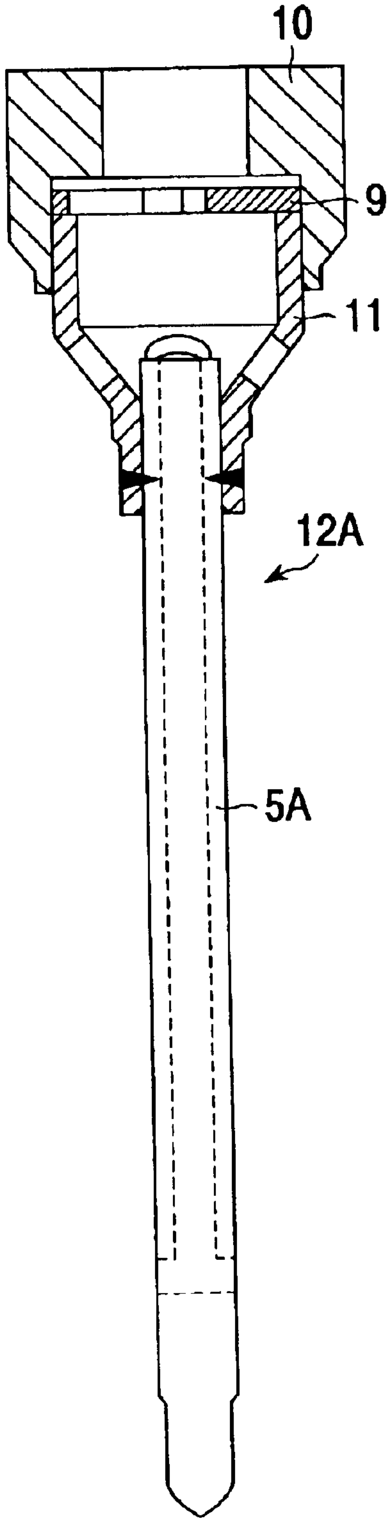
FIG. 13 is a longitudinal section view of a movable unit of an electromagnetic fuel injection valve according to another embodiment of the invention.
Figure 14:
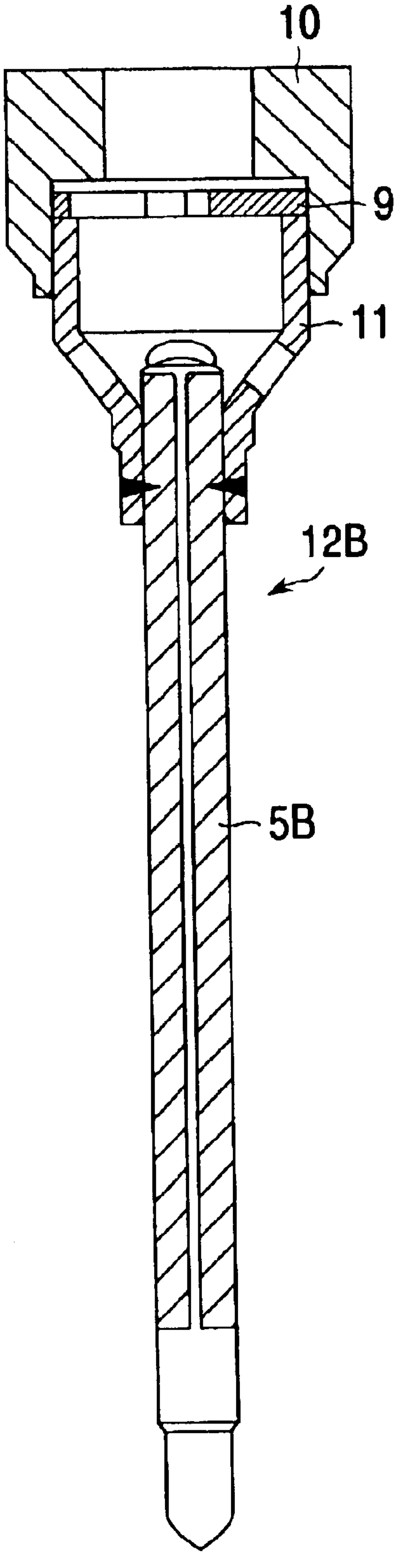
FIG. 14 is a longitudinal section view of a movable unit used of an electromagnetic fuel injection valve according to still another embodiment of the invention.

Next, referring to FIGS. 13 and 14, the configuration of fuel injection valves according to further embodiments of the invention will be described. FIGS. 13 and 14 are longitudinal section views showing the constructions of the movable units in the fuel injection valves of these embodiments. In the drawings, the same reference numerals as those of FIG. 3 denote the same parts.

A movable unit 12A shown in FIG. 13 comprises a movable core 10, a damper plate 9, a joint 11 and a valve element 5A. While the valve element 5 shown in FIG. 3 is made by machining a round rod, the valve element 5A is made from a pipe. This construction can reduce the weight of the movable unit 12A and further improve the responsiveness. Since fuel flows also into the pipe valve element 5A, fuel discharge holes are formed through a lower part of the valve element 5A.

A movable unit 12B shown in FIG. 14 comprises a movable core 10, a damper plate 9, a joint 11 and a valve element 5B. The valve element 5B is shaped like a cotter pin with a slit formed in its side. This construction can reduce the weight of the movable unit 12B and further improve the responsiveness. The valve element 5B can easily be fabricated by curling a plate material while forming a slit in its side.

As described above, the present invention can improve the responsibility of the electromagnetic fuel injection valve.

It will be understood by those skilled in the art that the foregoing description has been made on the embodiments of the invention and that various changes and modifications may be made in the invention without departing from the spirit of the invention and the scope of the appended claims.

What is claimed is:

1. An electromagnetic fuel injection valve comprising:

a movable unit having a valve element;

an electromagnetic coil;

a magnetic circuit for magnetically attracting the movable unit toward a valve opening side by energizing the electromagnetic coil, said magnetic circuit including a hollow, cylindrical stationary core defining a fuel passage extending axially through an injection valve body, a hollow seal ring made from one of a nonmagnetic material and a feeble magnetic material, a hollow nozzle housing, and a movable core constituting a part of the movable unit; and said stationary core and said nozzle housing being joined together through the seal ring.

2. An electromagnetic fuel injection valve according to claim 1, wherein said seal ring has a flange at a lower portion thereof, a lower portion of said stationary core is press-fitted into an upper part of the seal ring and welded thereto for sealing fuel, and said flange of the seal ring is press-fitted into a receiving recess formed at an upper end of the nozzle housing and is welded thereto for sealing fuel.

3. An electromagnetic fuel injection valve according to claim 2, wherein one of a rounded portion and a tapered portion serving as a curved guide surface for press-fitting into the seal ring is provided on an outer circumference of a lower end of said stationary core, and a hard coating is formed from a lower end face of the stationary core to the rounded or tapered portion.

4. An electromagnetic fuel injection valve according to claim 2, wherein a contact surface between said movable unit and said stationary core is provided near an upper end of the flange of the seal ring.

5. An electromagnetic fuel injection valve according to claim 1, wherein said seal ring has a lower end portion thereof formed to gently increase in inner diameter toward a lower end thereof, and an inner diameter of the lower end portion of the seal ring is larger than an inner diameter of the nozzle housing.

6. An electromagnetic fuel injection valve according to claim 1, wherein said movable core has a thin-walled portion formed at a lower portion thereof.

7. An electromagnetic fuel injection valve according to claim 1, wherein said movable unit comprises the movable core, the valve element, and a joint connecting the movable core and the valve element, and said joint comprises an upper cylinder portion, a lower cylinder portion smaller in diameter than the upper cylinder portion, and a tapered or spherical joint portion with a small fluid resistance, which connects the upper cylinder portion and the lower cylinder portion.

8. An electromagnetic fuel injection valve according to claim 7, wherein said joint portion of the joint has resiliency.

9. An electromagnetic fuel injection valve according to claim 8, wherein a leaf spring is interposed between said movable core and said joint.

10. An electromagnetic fuel injection valve according to claim 7, wherein said joint portion of the joint has at least one hole for passing fuel, and a total cross-sectional area of this hole is larger than a cross-sectional area of an axial fuel passage hole formed in the movable unit.

* * * * *